United States Patent [19]

Bishop

[11] Patent Number: 4,703,880

[45] Date of Patent: Nov. 3, 1987

[54] BELT FOR A CABLE DRIVE SYSTEM

[75] Inventor: Bernard F. Bishop, Chicago, Ill.

[73] Assignee: Illinois Tool Works Inc., Chicago, Ill.

[21] Appl. No.: 774,767

[22] Filed: Sep. 11, 1985

[51] Int. Cl.⁴ .......................................... B65H 51/18
[52] U.S. Cl. .................................... 226/172; 226/170
[58] Field of Search ............... 226/170, 171, 172, 173; 198/844

[56] References Cited

U.S. PATENT DOCUMENTS 1,941,993  1/1934  Minton ................................. 226/170
4,274,574  6/1981  Bishop ................................. 226/170

FOREIGN PATENT DOCUMENTS 1059644  3/1957  Fed. Rep. of Germany ...... 226/173

Primary Examiner—Stuart S. Levy
Assistant Examiner—Lynn M. Sohacki
Attorney, Agent, or Firm—D. I. Roche; T. W. Buckman

[57] ABSTRACT

A drive belt for a linear motion drive system in which a plurality of drive belts are helically disposed and rotated about a driven element to axially advance the element along its axis. The belts include a pair of spaced legs which resiliently abut legs of adjacent belts to equally space the belts about the periphery of the driven element. The legs also are adapted to accommodate changes in diameter of the driven element.

9 Claims, 7 Drawing Figures

BELT FOR A CABLE DRIVE SYSTEM

BACKGROUND AND SUMMARY OF THE INVENTION

This invention relates to drive belts, and in particular to drive belts for use in a linear motion cable drive mechanism in which a plurality of drive belts are helically wrapped around a driven element. An example of such a cable drive mechanism is shown in U.S. Pat. No. 4,274,574. Such mechanisms employ a plurality of drive assemblies, each including a set of pulleys and a drive belt, to advance an elongated driven element along its longitudinal axis. Each of the drive belts is wrapped helically about the driven element such that simultaneous rotation of the assemblies and lengthwise movement of the drive belts causes advancement of the driven element without rotation thereof.

The path travelled by drive belts in such systems causes the belts to undergo a variety of stresses. Fleet angle fluctuations, small pulley radii, and substantial twisting of the drive belts are examples of factors which contribute to difficulties in belt design.

A characteristic of cable drive systems which utilize helically disposed belts in that as tension in the belts increases, there is a tendency for the belts to straighten, and for the driven element to disengage itself from contact with the drive belts. It is desirable to maintain even spacing of the drive belts about the driven element. Furthermore, because variations in diameter in the driven element, there is a need to balance circumferential forces between the belts.

Drive belts made in accordance with the present invention satisfy the above requirements, and a preferred embodiment of the invention comprises a continuous loop of water resistant material with at least one encapsulated strength member inside. The belt has two resilient legs which abut legs of adjacent belts to insure even spacing of a plurality of belts when the belts are helically wrapped around a driven element. A belt of the present invention may have a generally U-shaped or a generally W-shaped cross section.

These and other aspects of the invention will be better understood by reading the following specification in conjunction with the accompanying drawings.

DETAILED DESCRIPTION OF THE INVENTION

Figure 1:
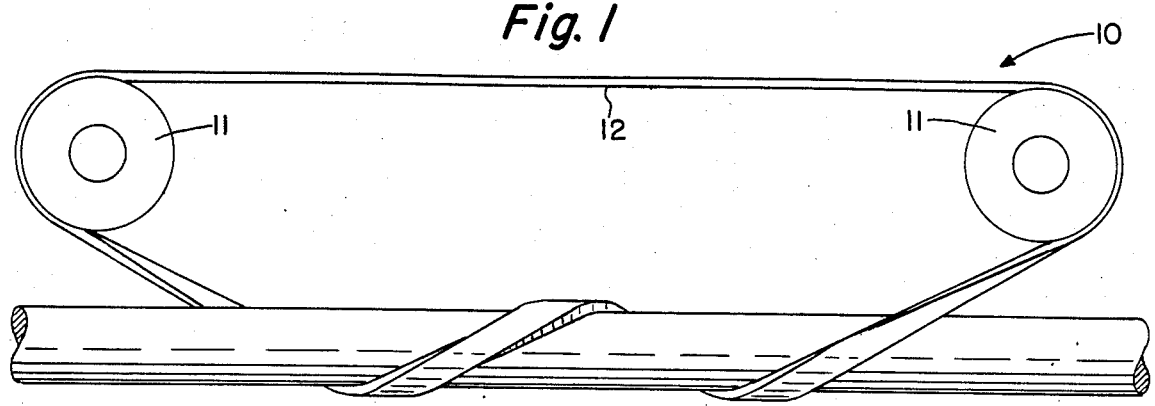
FIG. 1 is a side elevational view in partial section showing a portion of a drive system in which the present invention is usable.

FIG. 1 shows a drive assembly of the type described in more detail in U.S. Pat. No. 4,274,574 to Bernard F. Bishop (hereinafter referred to as the "Bishop patent"), which is incorporated herein by reference. The Bishop patent describes a linear drive mechanism in which a plurality of drive assemblies are used to advance a driven element along its axis without imparting rotational movement thereto.

FIG. 1 shows a drive assembly 10, similar to the one of the Bishop patent, comprised of a pair of pulleys 11 and a belt 12. For purposes of illustration, the belt 12 in FIG. 1 is shown schematically as a flat member in order to show the twisting which necessarily occurs between each of the pulleys 11 and the driven element 14. A complete drive system is usually comprised of a plurality of belts which substantially surround the driven element 14.

Figure 2:
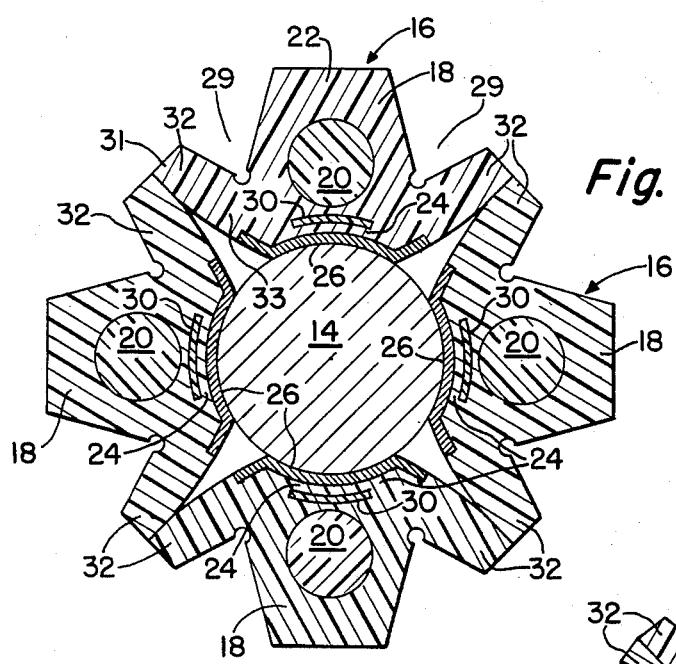
FIGS. 2, 3 and 4 are cross sectional views of driven elements of various diameters driven by belts of the present invention.

FIG. 2 shows a driven element 14 with four W-shaped belts 16 disposed at equal intervals about the circumference of the driven element 14. Each belt 16 is comprised of a molded polyurethane outer portion or casing 18 and a strength member 20 having a generally circular cross section, preferably comprised of a low elongation DACRON ® material. The strength member 20 is centered in an enlarged or protuberant body portion 22 of the belt 16. The legs 32 define a large groove 29 on the upper part of the belt 16. The groove 29 is separated into two parts by the protuberant body portion 22 and the strength member 20.

The inner portions 24 of the belts contact the driven element, and preferably have a surface reinforcement 26 made of woven nylon fabric. Between the reinforcement 26 and the strength member 20 is a second strength member 30 made of an aromatic polyamide material such as KEVLAR ® ribbon. The flexible legs 32 are generally tapered such that outer portions 31 are thinner than inner portions 33 thereof. It should be noted that the body portion 22 is similarly tapered. The inner portion 24 of the belt 16 is generally molded to an arcuate shape matches the curvature of the driven element 14 as shown in FIG. 2.

Driven elements of the type contemplated for use with the present invention, generally include some sections of varying cross sectional diameter. In FIG. 2 the belts 16 are shown surrounding a normal section of a driven element 14. In FIG. 2 the legs 32 are in light abutting contact with legs of adjacent betls. Such abutting contact tends to equally space the plurality of belts 16 about the driven element 14. Also, the inner portion 24 of the belt 16, particularly the part containing the fabric 26 is in continuous contact with the periphery of the driven element 14. It should be noted that the vast majority of the driven element 14 has a cross section of the type shown in FIG. 2. Therefore, the normal configuration of the legs 32 is in the slightly flexed configuration shown in FIG. 2.

Figure 3:
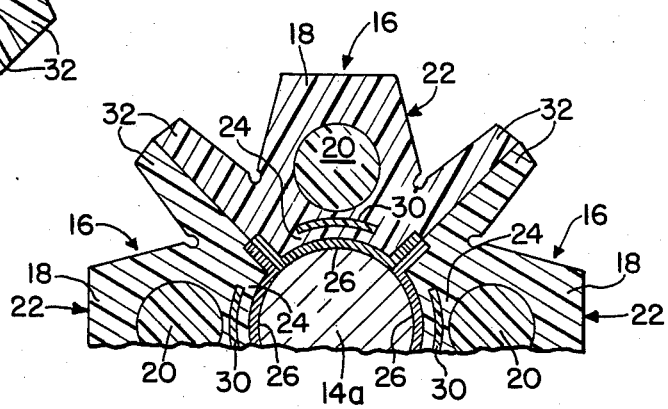

FIG. 3 shows a narrowed section 14a of the driven element 14 with a diameter substantially less than the diameter of the element as shown in FIG. 2. When the belts 16 surround a narrowed section 14a of the driven element 14, the legs 32 are in significantly increased abutting contact. Nevertheless, the inner portion 24 of each belt, and the corresponding fabric 26, conform to the smaller shape of the narrowed section 14a. The legs 32 are sufficiently resilient to allow the inner portions 24 to move inwardly when a narrowed section 14a is encountered. The centering function of the legs operates to equally space the belts 16 about the periphery of the narrowed section 14a of the driven element 14.

Figure 4:
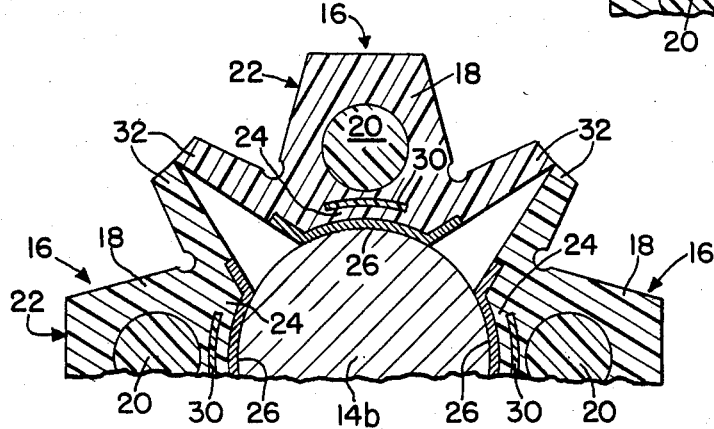

FIG. 4 shows an enlarged section 14b of the driven element 14. In this case, the legs 32 of adjacent belts 16 may only be adjacent, or in very slight abutting contact. Again, the resilient nature of the casing 18 allows the inner portions 24 and the associated fabric 26 to conform to the enlarged (less curved) section 14b of the driven element 14. When an enlarged section 14b of the driven element 14 is encountered, the resilient legs 32 again serve to equally space the belts around the driven element 14.

In the embodiment of the invention as shown in FIGS. 2, 3 and 4, the flat strength member 30 tends to evenly distribute radially inward forces. Because of the frequent flexing of the legs 32, the juncture 28 between the leg 32 and its associated body portion 22 is provided with a fillet in order to reduce stress concentrations and the likelihood of tearing. It should be noted that stopping and starting of the drive assemblies causes significant variations in fleet angle where the belts meet associated pulleys. The flexible nature of the resilient legs 32 in addition to providing the spacing function discussed above, reduces belt wear caused by fleet angle variations.

Figure 5:
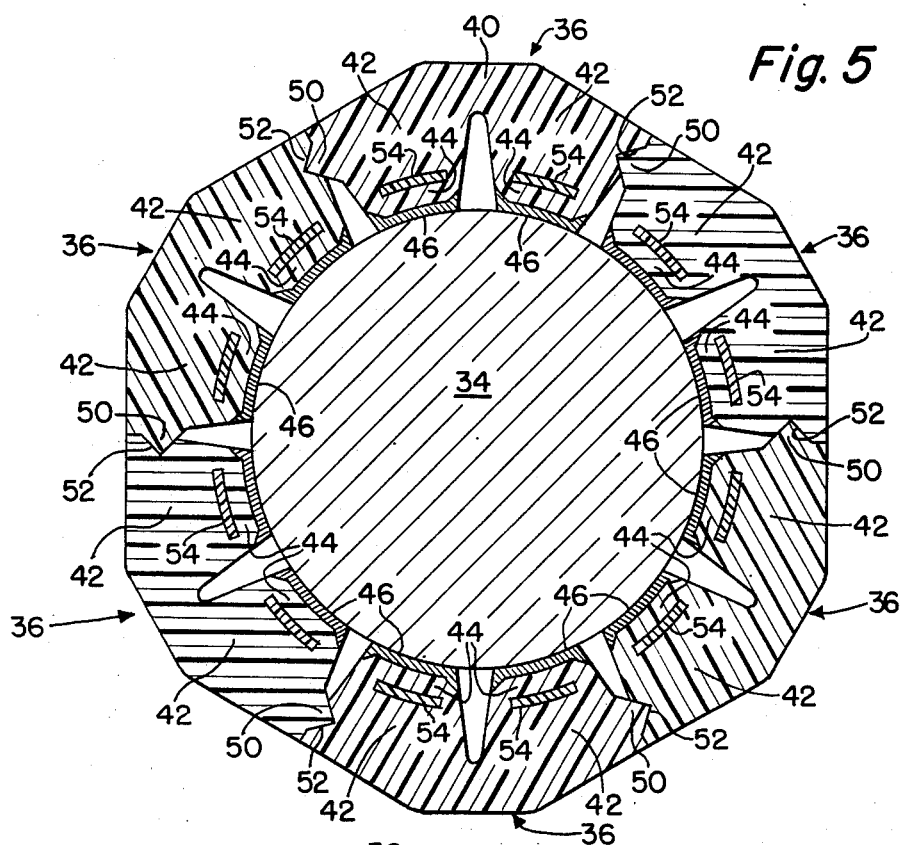
FIGS. 5, 6 and 7 are cross sectional views of a driven element having various diameters driven by an alternative embodiment of the present invention.
Figure 6:
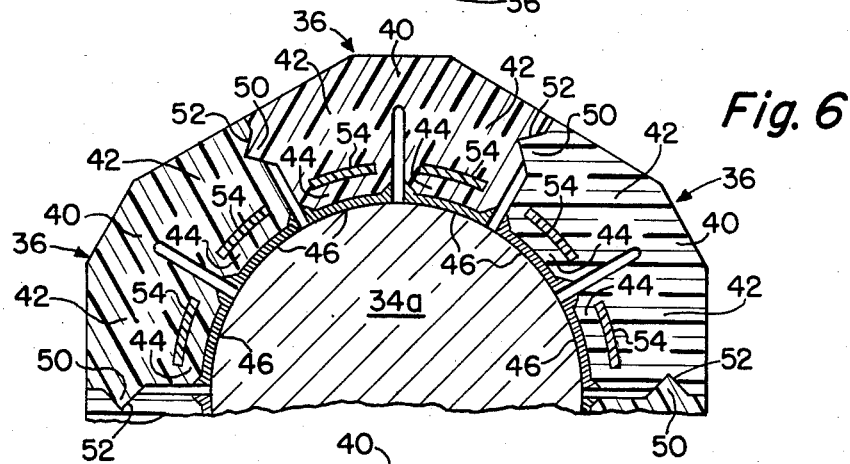
Figure 7:
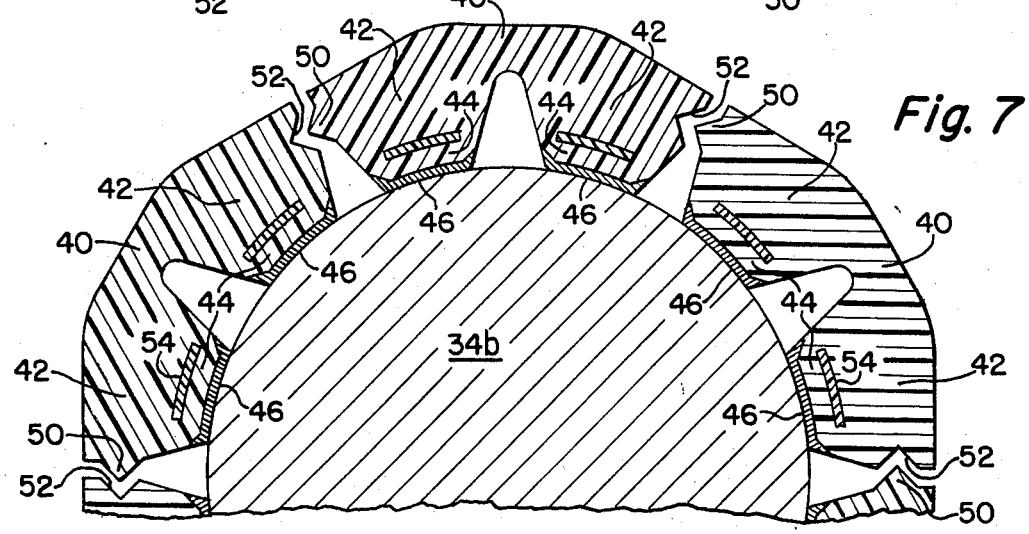

FIGS. 5, 6 and 7 show an alternative embodiment of the present invention. In FIG. 5 a plurality of six belts 36 surround a large driven element 34. The belts 36 are each comprised of two resilient legs 42 which are joined by a resilient center section 40. Each of the legs 42 is generally tapered from an inner free end 44 which carries an integrally molded fabric 46 of the type mentioned above, to a thicker end which is adjacent to the center section 40. Each of the legs 42 is molded around a flat strength member 54 made of an aromatic polyamide material such as KEVLAR ® ribbon. Each of the belts 36 includes an interlocking rib 50 and similarly shaped groove 52. Each rib 50 fits into the corresponding groove 52 of an adjacent belt when the belts surround the driven member 34.

As discussed above the driven element 34 contains sections of smaller and larger diameters. Therefore, the belt 34 of the present invention is designed to accommodate these differing diameters. FIG. 6 shows a narrowed section of the driven element 34. Space between the legs 42 is reduced, and the legs 32 are less compressed, which reduces the overall width of each belt. The reduced width of the belts allows the same number of belts to fit around the driven element 34, while allowing the belts 36 to tightly encapsulate the driven element 34. The interlocking ribs 50 and grooves 52 prevent distortion of the total belt configuration.

FIG. 7 shows an enlarged section of the driven element 34. When the drive assembly encounters an enlarged section of the driven element 34, the belts 36 undergo increased tension. This increased tension results in compression and widening of the belts 36. The resilient nature of the belts 36 and legs 32 tends to cause equal spacing of the belts 36 about the driven element 34.

When the belts 36 encounter sections of the driven element 34 of varying diameters, the resilient legs 42 pivot about the resilient section 40, and the legs 42 change their cross sectional shape to facilitate encapsulation and equal spacing of the belts about the driven element 34. The belt of FIGS. 5, 6 and 7 has an inner portion or bearing surface which is capable of conforming to the varying shapes of a driven element. The radius of curvature of the bearing surfaces in FIGS. 5, 6 and 7 are 1½ 1¼ and 2 inches, respectively.

The above description of the preferred embodiments of the present invention are but examples of the many alternatives, variations, and modifications which are intended to be within the scope of the appended claims.

I claim:

1. A set drive belts for a linear cable drive mechanism in which a plurality of drive belts are helically wrapped around a generally elongated driven element, said set of belts comprising a plurality of greater than two belts, each of said belts comprising a continuous loop of water resistant material, and each including resilient lateral adjustment means allowing said belt to assume various cross-sectional gripping shapes whereby said belt can symmetrically encapsulate enlarged portions of said driven element; said lateral adjustment means comprising two legs configured to allow resilient movement toward and away from each other each belt containing two strength members, each of said strength members being located at a free end of one of said legs.

2. A set of belts in accordance with claim 1 wherein each belt includes at least one continuous groove along its length disposed between said legs to facilitate said resilient movement by said legs.

3. A set of belts in accordance with claim 2 wherein at least a portion of each belt contains a surface reinforcing fabric.

4. A set of belts in accordance with claim 1 wherein each belt has a generally U-shaped cross section, said legs being joined at a connecting section, said legs having an decreasing thickness in a direction away from said connecting section.

5. A set of drive belts for a linear cable drive mechanism in which a plurality of drive belts are helically wrapped around a generally elongated driven element, said set of belts comprising a plurality of greater than two belts, each of said belts comprising a continuous loop of water resistant material each belt including interlocking means to positively engage a similarly shaped adjacent belt when wrapped around a driven element and each including resilient lateral adjustment means allowing said belt to assume various cross-sectional gripping shapes whereby said belt can symmetrically encapsulate enlarged portions of said driven element: said lateral adjustment means comprising two legs configured to allow resilient movement toward and away from each other.

6. A set of belts in accordance with claim 5 wherein said interlocking means includes a continuous protrusion along one side of each belt, and a similarly shaped continous groove on an opposite side of each belt.

7. A set of belts in accordance with claim 5 wherein each belt includes at least one continuous groove along its length disposed between said legs to facilitate said resilient movement of said legs.

8. A set of belts in accordance with claim 7 wherein at least a portion of each belt contains a surface reinforcing fabric.

9. A set of belts in accordance with claim 5 wherein each belt has a generally U-shaped cross section, said legs being joined at a connecting section, said legs having a decreasing thickness in a direction away from said connecting section.

* * * * *